June 9, 1964   R. P. PUTKOVICH ETAL   3,136,957
MULTIPHASE ELECTRICAL GENERATORS
Original Filed Jan. 24, 1958   3 Sheets-Sheet 1

WITNESSES
John E. Heasley, Jr.
James F. Young

INVENTOR
Rudy P. Putkovich &
Thomas M. Corry
BY
David M. Schiller
ATTORNEY

United States Patent Office 3,136,957
Patented June 9, 1964

3,136,957
MULTIPHASE ELECTRICAL GENERATORS
Rudy P. Putkovich, Export, and Thomas M. Corry, Monroeville, Pa., assignors to Westinghouse Electric Corporation, East Pittsburgh, Pa., a corporation of Pennsylvania
Continuation of application Ser. No. 710,934, Jan. 24, 1958. This application June 13, 1962, Ser. No. 205,161
22 Claims. (Cl. 331—52)

This invention is a continuation of our copending application, Serial No. 710,934, filed January 24, 1958 for Multiphase Electric Generators (now abandoned) and relates to multiphase electrical generators and has particular relation to multiphase generators of static construction free of moving parts.

In the past a number of different constructions have been utilized for generating multiphase electrical power. Generally such constructions have employed a number of moving parts. As an example, large rotating machines have previously been utilized for generating multiphase electrical power. Such generators have been of bulky construction, low efficiency and quite expensive.

In accordance with the present invention, an improved multiphase generator is provided which is constructed entirely of static components without any moving parts. Although the invention may be employed to provide a multiphase output having any desired number of phases, the invention will be described in connection with a generator for producing a three-phase alternating current output.

In a preferred embodiment of the invention, a plurality of electrical inverter or oscillator circuits are employed for producing from a source of direct voltage a multiphase alternating current output with a number of phases equal to the number of inverters. Each of the inverters may be similar in construction to the inverter circuit shown and described in U.S. Patent No. 2,783,384 assigned to the assignee of the present invention. Such an inverter circuit includes a pair of transistor switches which are operable in phase opposition relative to each other for switching a source of direct voltage across the primary winding of a saturating transformer periodically to thereby establish an alternating output voltage across the secondary of the transformer. The alternating output has a rectangular waveform with a frequency proportional to the magnitude of the direct voltage input.

In the present invention phase locking means are provided to establish desired phase displacements between the outputs of the inverters. To this end the phase locking means are arranged to establish desired phase displacements between the operating phases of the switches of the inverter circuits to thereby establish the desired phase displacements between the inverter outputs. In a preferred embodiment of the invention, the phase locking means include a plurality of saturable reactors each connected for energization in accordance with an alternating output produced in response to operation of the controlling or master inverter circuit.

In a three phase generator one arrangement is such that when operation of the master inverter is initiated its output is applied to a saturable reactor associated with a second controlled or slave inverter to delay operation of the second inverter until the elapse of ⅓ of 1 cycle of operation of the master inverter. In a similar manner, a saturable reactor is provided between the second inverter and a third inverter to delay operation of the third inverter until the elapse of ⅓ of 1 cycle of operation of the second inverter. As a result three alternating outputs are provided which are phase displaced relative to one another by 120°.

The invention further provides an improved arrangement for assuring the starting of the controlling or master inverter. Such means conveniently may take the form of a reactive component which is connected between the negative terminal of the input quantity and the base electrode of one transistor of the master inverter. This arrangement is effective to introduce an unbalance into the master inverter to thereby assure that said one of the transistors will assume a conducting condition to start operation of the master inverter.

The invention further provides an improved arrangement for effecting the switching action of the switches in the master inverter. In the previously referred to patent, the switching action is effected in response to saturation of the magnetic core of a transformer. In the present invention, improved results are obtained by utilizing a saturable reactor energized from the transformer core to effect the switching action without saturation of the transformer core.

The invention further contemplates the provision of a three-phase generator wherein the outputs have rectangular wave shapes configured to permit the delta connection of the outputs without introducing large circulating currents in the system. Such large currents are avoided by the generation of alternating outputs having phase displacements such that the algebraic sum of the outputs is continuously zero.

It is therefore an object of the invention to provide a multiphase electrical generator of improved construction.

It is another object of the invention to provide a multiphase electrical generator which is constructed solely of static components without any moving parts.

It is a further object of the invention to provide a multiphase generator of improved construction for producing phase displaced outputs having rectangular wave shapes.

It is still another object of the invention to provide a multiphase electrical generator including a master oscillator and a plurality of slave oscillators with phase locking means connecting the oscillators to establish phase displacements between the outputs of the oscillators.

It is a still further object of the invention to provide a generator including a plurality of oscillators each having a pair of switches operable in phase opposition with respect to each other to produce an alternating output having a frequency determined by the frequency of operation of the switches with saturable reactor phase locking means for establishing displacements between the operating phases of the switches of the oscillators to thereby establish displacements between the outputs of the oscillators.

It is another object of the invention to provide an oscillator including a pair of transistor switches with improved means for initiating operation of the switches to start operation of the oscillator.

It is still another object of the invention to provide an oscillator including a pair of transistor switches with improved means for effecting the switching of the transistors.

Other objects of the invention will become apparent when taken in conjunction with the accompanying drawings, in which.

Figure 1:
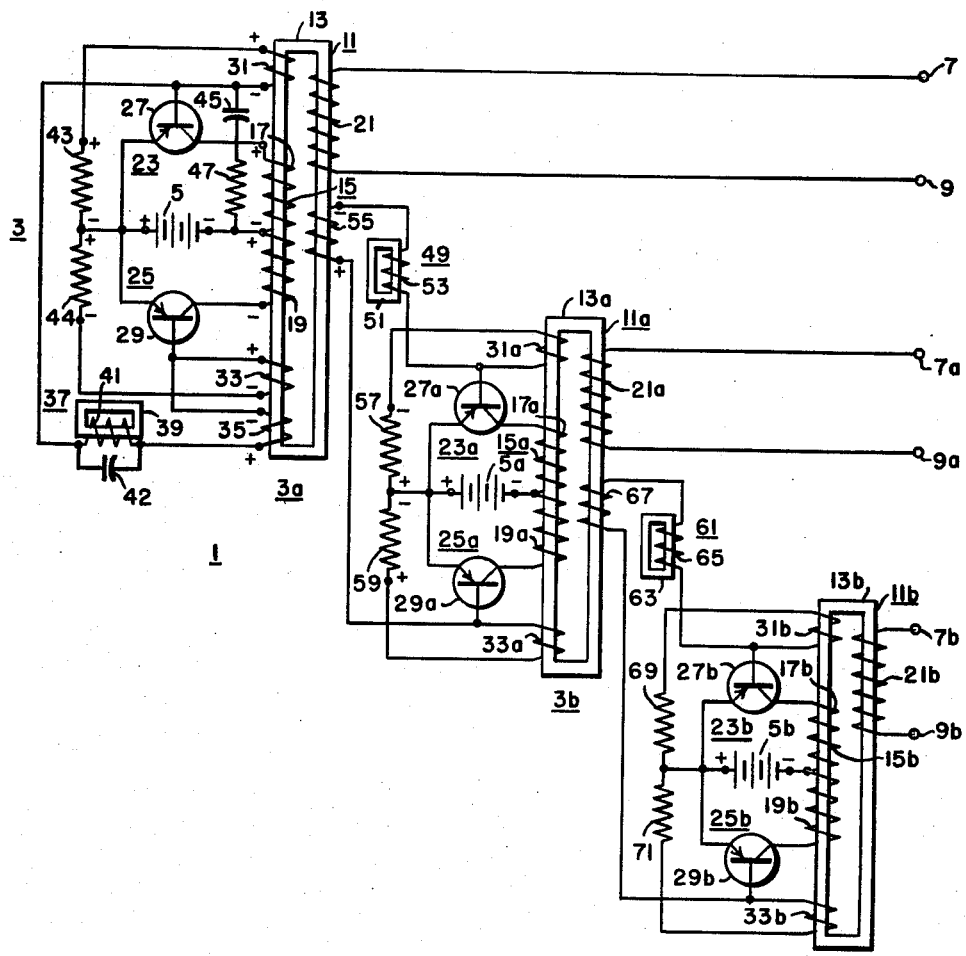
FIGURE 1 is a circuit diagram illustrating a multiphase electrical generator embodying the teachings of the invention.
Figure 2:
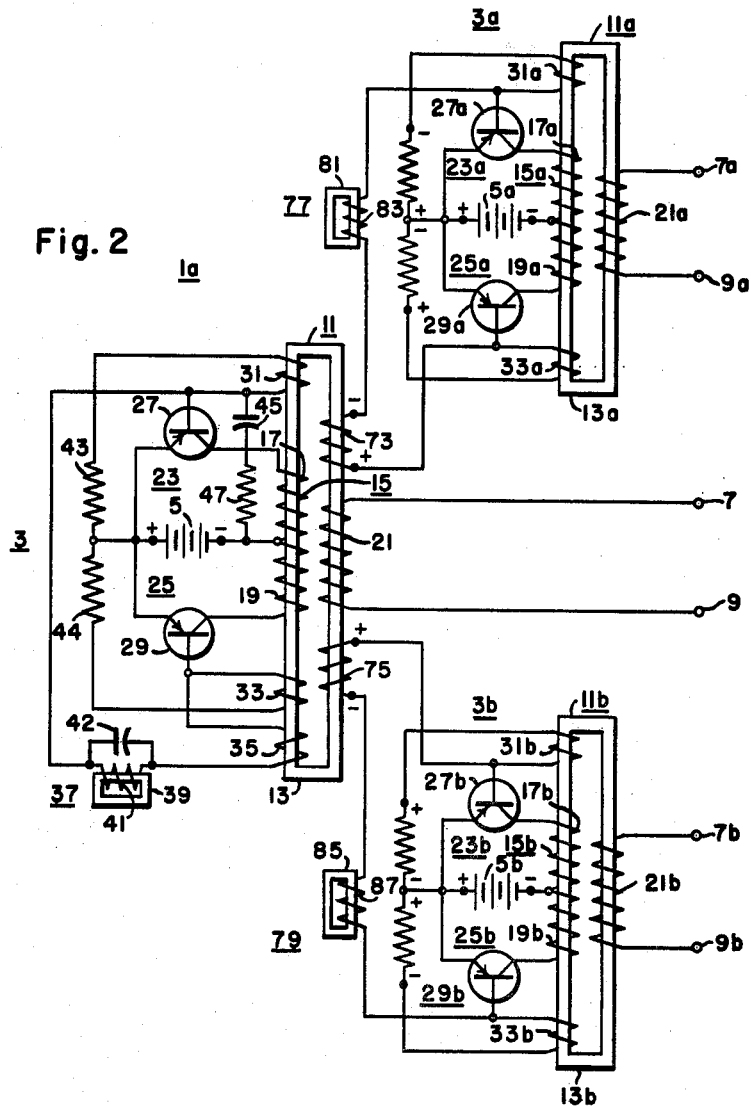
FIG. 2 is a circuit diagram of a multiphase generator of different construction from the generator shown in FIG. 1.
Figure 4:
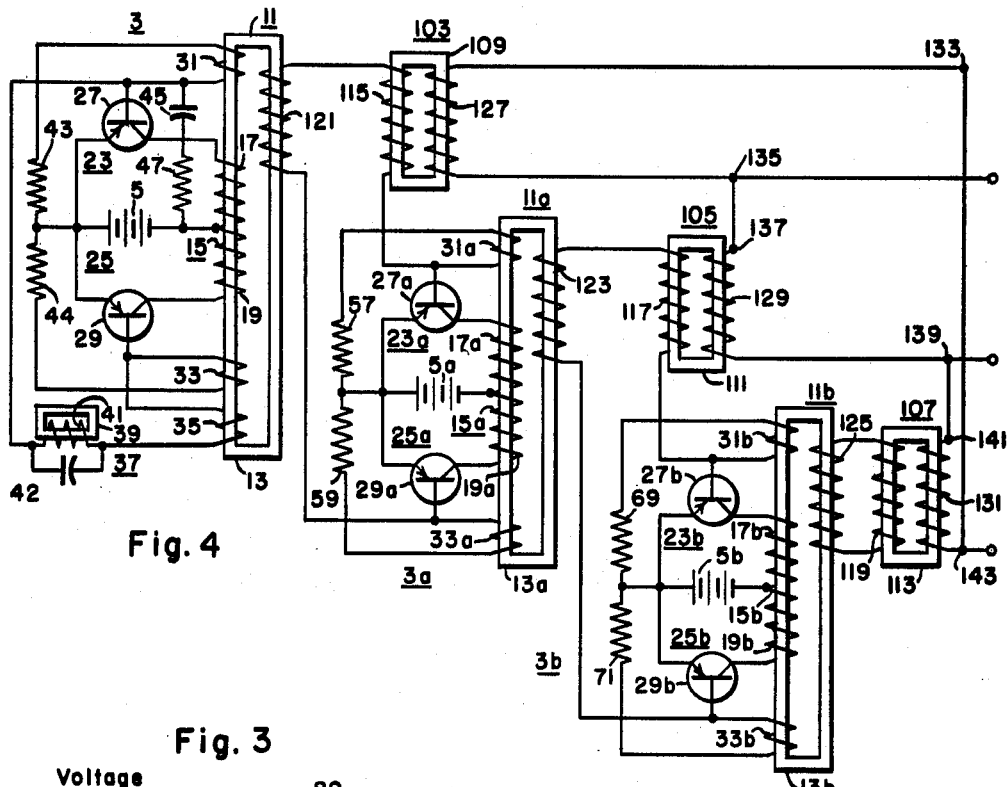
Figure 3:
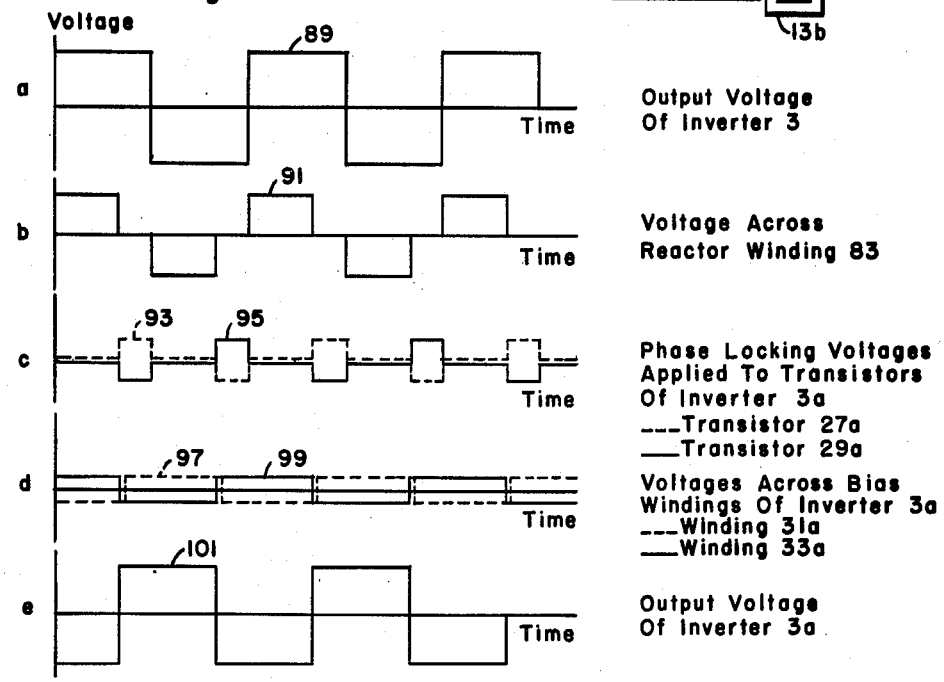

FIGS. 3, 3a, 3b, 3c, 3d and 3e illustrate graphical representations depicting various electrical quantities present in the circuits of FIGS. 1 and 2; and FIG. 4 is a circuit diagram illustrating a multiphase electrical generator of different construction from the circuits of FIGS. 1 and 2.

Referring now to the drawings, there is illustrated in FIG. 1 a multiphase electrical generator represented generally by the numeral 1 embodying the teachings of the present invention. Although the invention is applicable to the generation of any desired number of phases, the invention will be described in connection with a generator for producing a three-phase alternating current output.

In the present invention the generator 1 includes three inverters or oscillators each having a construction similar to the construction of the inverter found in FIG. 1 of U.S. Patent No. 2,783,384. However, important differences do exist which will be described hereinafter.

Each of these oscillators is effective to produce from a source of direct voltage an alternating output having a rectangular wave pattern with a frequency proportional to the magnitude of the direct voltage. The number of phases generated by the generator 1 is equal to the number of inverters utilized. In order to generate a three-phase output, the generator 1 includes three inverters 3, 3a and 3b. Inasmuch as the inverters are of similar construction, the construction and operation of only one of these inverters will be described.

The inverter 3 is arranged to control operation of the inverters 3a and 3b and for this reason will be referred to as a master inverter whereas the two remaining controlled inverters 3a and 3b will be referred to as slave inverters. The master inverter 3 is arranged for energization from a source of direct voltage 5 to produce an alternating output across a pair of output terminals 7 and 9. For this purpose the inverter 3 includes a transformer 11 having a magnetic core 13. In the above referred to patent, the corresponding magnetic core 21 of FIG. 1 is designed for magnetic saturation within the range of magnetization thereof. If desired, the core 13 of the present invention may in a similar manner be designed for magnetic saturation. However, as will appear hereinafter, improved performance of the generator 1 is obtained if the core 13 is designed so as to be operated in a magnetically unsaturated condition. The core 13 may be formed of any suitable magnetic material such as silicon steel.

In order to permit magnetization of the core 13, primary winding means 15 is provided to link the core 13. The winding means 15 includes two sections 17 and 19. A secondary winding 21 also links the core 13 in inductive relation with the winding means 15 and is connected to the terminals 7 and 9.

The winding sections 17 and 19 are connected for energization from the source 5 through parallel paths 23 and 25 to permit opposing directions of magnetization of the core 13. A pair of switch devices 27 and 29 preferably in the form of transistors are provided to control energization of the winding sections 17 and 19. For this purpose the transistors have their emitter and collector electrodes included respectively in the paths 23 and 25. Although the transistors are illustrated as being of the PNP type, NPN transistors may be employed if desired. The transistors 27 and 29 are operated as controlled switches such that they have operating conditions in phase opposition with respect to each other which are periodically reversed. The operation of transistors as controlled switch devices is discussed in detail in the aforementioned patent.

In order to control operation of the transistors 27 and 29, a pair of biasing windings 31 and 33 link the core 13 in inductive relation with respect to the winding means 15. In the present invention, the switching of the transistors 27 and 29 is controlled in a manner which differs materially from the manner of control disclosed in the aforementioned patent. In FIG. 1 of the aforementioned patent, the biasing windings 33 and 31 effect switching of the transistors 3 and 5 in response to saturation of the core 21. In the present invention, the biasing windings 31 and 33 operate only to maintain the switched conditions of the transistors and do not operate to effect the switching action.

In the present invention the switching action is effected by improved means including an additional winding 35 which links the core 13 in inductive relation with the winding means 15. The switching means further includes a saturable reactor 37 having a saturable magnetic core 39 preferably constructed of material which exhibits substantially rectangular hysteresis loop characteristics. A winding 41 links the core 39 and is connected in series circuit relation with the windings 31, 33 and 35. A condenser 42 is connected across the winding 41 to minimize voltage spikes appearing across the transistors during the switching action. A pair of resistors 43 and 44 are connected in series with the windings 31, 33, 35 and 41 with a point intermediate the resistors 43 and 44 connected to the emitter electrodes of the transistors 27 and 29.

A brief description of the operation of the master inverter 3 now follows. When the source 5 is connected in the circuit, one or the other of the transistors 27 and 29 ordinarily will begin to conduct to start operation of the device. It has been observed, however, that in some instances, especially when the inverter is connected to a load device, that neither of the transistors will assume a conducting condition. The ease of starting the inverter depends upon the unbalance of the circuit and upon the gain of the transistors. If transistors of high gain are utilized, the inverter will start in almost every instance even when connected to a load device.

In order to minimize the need for employing high gain transistors, the invention provides means for deliberately introducing an unbalance into the inverter. This may be accomplished by connecting a reactive impedance element between the negative terminal of the source 5 and the base electrode of one of the transistors. As shown in FIG. 1, a condenser 45 is connected between the negative terminal of the source 5 and the base electrode of the transistor 27. A suitable resistor 47 is connected in series with the condenser 45 to prevent the condenser from shunting excessive base current each time the biasing voltages induced in the winding 31 reverse polarity.

With the arrangement as above-described the transistor 27 will assume a conducting condition due to the flow of current from the source 5 through the emitter and base electrodes of the transistor 27, the condenser 45 and back to the source 5. When the transistor 27 is conducting current from the source 5 flows through the winding section 17 to establish a magnetomotive force which directs magnetic flux through the core 13. This flux induces voltages in the windings 31 and 33 having polarities indicated by the associated plus and minus signs effective to maintain the transistor 27 in a conducting condition and the transistor 29 in a non-conducting condition.

A voltage is also induced in the winding 35 having the polarity indicated by the associated plus and minus signs. This voltage is effective to direct current through the series circuit including the windings 31, 33 and 41 and the resistors 43 and 44. With the core 39 of the reactor 37 in an unsaturated condition at this point, the impedance of the winding 41 is very high with the result that substantially the entire voltage induced in the winding 35 is applied across the winding 41. This condition prevails until the core 39 attains a saturated condition at which time the impedance of the winding 41 is reduced to a very low value. This results in the application of the voltage of the winding 35 across the resistors 43 and 44 with polarities as indicated by the associated plus and minus signs. These voltages are applied to the transistors 27 and 29 such that the transistor 27 is transferred to a non-conducting condition and the transistor 29 is transferred to a conducting condition. The cycle above described is then repeated with the transistor 29 in a conducting condition. The result is continued oscillations of the inverter 3 with an alternating voltage induced in the winding 21 having a rectangular waveform with a frequency proportional to the magnitude of the source 5.

With the switching arrangement as above described, improved performance of the inverter 3 has resulted. In previous arrangements wherein a single saturable magnetic device effects both the switching action and the maintenance of the switched conditions of the switches, it has been observed that the saturation of such magnetic device results in the flow of magnetizing currents of considerable value during the switching transient. In the present invention, the switching reactor may be designed to require magnetizing currents when saturated which are considerably smaller than those encountered in previous arrangements. As a result, the current flowing through the transistors during the switching transient in the improved arrangement is considerably less so that the power dissipation in the transistors is also reduced correspondingly. The overall effect of this is an improved performance of the inverter 3 with increased efficiency.

Inasmuch as the slave inverters 3a and 3b are similar in construction and operation to the master inverter 3, components of the inverters 3a and 3b which are similar to components of the invetrer 3 are represented by the same reference numerals with the suffixes a and b added respectively. In order to provide a three-phase output, the operation of the slave inverters 3a and 3b of the generator 1 is controlled by operation of the master inverter 3 such that the outputs of the slave inverters are displaced in phase respectively 120° and 240° from the output of the master inverter.

In accordance with the present invention, the generator 1 includes phase locking means connected for energization in accordance with outputs produced in response to operation of the master inverter to establish phase displacements between the operating phases of the switches of the slave inverters relative to the operating phase of the switches of the master inverter. Inasmuch as the frequency of the outputs of the inverters is determined by the frequency of reversal of the operating phases of the respective switches, such arrangement will result in the production of three-phase-displaced outputs.

In the specific embodiment illustrated in FIG. 1, the phase locking means includes a saturable reactor 49 effective to establish a phase displacement between the outputs of the inverter 3 and the inverter 3a. The reactor 49 is connected for energization in accordance with the output of the inverter 3 to control the switching of the transistors of the inverter 3a. For this purpose the reactor 49 includes a magnetic core 51 which is preferably formed of a material exhibiting substantially rectangular hysteresis loop characteristics. The core 51 includes a winding 53 and is designed for magnetic saturation within the range of energization of the winding 53. The winding 53 is connected in series relation with a winding 55 which links the core 13 of the inverter 3 for energization in accordance with voltage induced in the winding 55. The winding 53 is further connected in series with the bias windings 31a and 33a of the core 11a and with a pair of resistor 57 and 59. A point intermediate the resistors 57 and 59 is connected to the emitter electrodes of the transistors 27a and 29a.

The operation of the phase locking means is similar to the operation of the switching means for the inverter 3. When the transistor 27 of the inverter 3 is conducting, a voltage is induced in the winding 55 having the polarity indicated by the associated plus and minus signs. This induced voltage directs current through the winding 53 to effect magnetization of the core 51. With the core 51 initially in an unsaturated condition, the impedance of the winding 53 is very high with the result that substantially all of the induced voltage is applied across the winding 53. When the core 51 saturates, the impedance of the winding 53 is reduced to a very low value with the result that the voltage induced in the winding 55 is applied across the resistors 57 and 59 with the polarities indicated by the associated plus and minus signs. These voltages have magnitudes and polarities effective to initiate conduction of the transistor 27a and to establish a non-conducting condition of the transistor 29a.

It is noted that the positive one-half cycle of operation of the inverter 3a is not initiated until the core 51 is saturated. Furthermore, the winding 53 is not energized until the initiation of the positive one-half cycle of operation of the inverter 3. Consequently the amount of the displacement between the outputs of the inverters 3 and 3a is determined by the time required for the core 51 to transfer between conditions of positive and negative saturation. This time depends on the cross-sectional area of the core 51, the saturation flux density of the core 51, the number of turns of the winding 53 and the voltage induced in the winding 55. By proper design of the various components, the time required for the core 51 to transfer between opposing conditions of saturation may be made to correspond to 120° of one cycle of the alternating output of the inverter 3. Such arrangement, then, results in the output of the inverter 3a lagging the output of the inverter 3 by 120°.

Inasmuch as the time required to transfer the core 51 between opposing conditions of saturation depends upon the voltage induced in the winding 55, variations in such voltage produced by changes in the voltage of the source 5 will result in alterations of the time required to saturate the core 51. However, the frequency of the output of the circuit 3 is also dependent upon the magnitude of the source 5 so that the phase relationship between the outputs of the circuits 3 and 3a is thereby unaffected by variations in the magnitude of the source 5. The magnitudes of voltages appearing across the resistors 57 and 59 should be slightly greater than the total magnitude of voltages induced in the windings 31a and 33a of the inverter 3a. This arrangement will result in an improved switching action of the transistors.

In order that the output of the inverter 3b may be made to lag the output of the inverter 3 by 240°, the invention provides that the inverter 3b is energized in accordance with the output of the inverter 3a through an additional phase locking reactor designed such that the time required to transfer the additional reactor between opposing conditions of saturation corresponds to 120° of one cycle of the output of the inverter 3a. To this end a reactor 61 identical to the reactor 49 may be provided. The reactor 61 includes a magnetic core 63 of identical construction to the core 61 with a winding 65 linking the core 63. Resistors 69 and 71 similar to the resistors 57 and 59 are connected in series with the windings 31b, 33b and 65. The operation and effect of the phase locking reactor 61 is identical to that of the reactor 49 and therefore need not be described.

In order to assure that operation of the slave inverters 3a and 3b is synchronized with operation of the master inverter 3 after a few cycles of operation of the inverter 3, it is desirable that the slave inverters be designed to have uncontrolled oscillations with frequencies slightly less than the frequency of oscillation of the master inverter. Although three distinct sources of direct voltage 5, 5a and 5b are illustrated in FIG. 1, it is to be understood that the inverters 3, 3a and 3b may be connected for energization from a common source of direct voltage. This source may assume any suitable form such as a conventional battery.

Referring now to FIG. 2, there is illustrated a multi-phase generator 1a of different construction than the generator 1 shown in FIG. 1. In FIG. 2, three inverters 3, 3a and 3b are illustrated which are of identical construction to the inverters illustrated in FIG. 1. However, the manner of connecting the several inverters in FIG. 2 differs materially from the manner of connection disclosed in FIG. 1.

In the embodiment of FIG. 2, the slave inverters 3a and 3b are connected to be controlled directly from the output of the master inverter. In FIG. 1 the arrangement is such that one slave inverter controls the operation of the remaining slave inverter. As shown in FIG. 2, the master inverter 3 includes a pair of windings 73 and 75 which link the core 13 in inductive relation with the winding means 15. It is noted that the windings 73 and 75 are wound so that voltages induced therein have opposing polarities as indicated by the associated plus and minus signs.

The windings 73 and 75 are connected to effect energization respectively of saturable phase locking reactors 77 and 79 for controlling respectively operation of the switches of the slave inverters 3a and 3b. With the arrangement of FIG. 2, it is necessary that the output of one of the slave inverters, such as the inverter 3a, be displaced from the output of the master inverter 3 by 120° whereas the output of the slave inverter 3b must be displaced from the output of the master inverter 3 by 240°. This is accomplished by providing a reactor 77 with a time of saturation which corresponds to 120° of one cycle of the output of the master inverter 3. In order to provide a displacement of 240° between the outputs of the inverters 3 and 3b, it is necessary to provide the reactor 79 with a saturation time which corresponds to 60 electrical degrees of one cycle of the master inverter 3, and to apply the voltage of the winding 75 to the transistors of the slave inverter 3b with polarity opposite to the polarity of voltage of the winding 73. With this arrangement a further 180° displacement is provided resulting in an overall displacement of 240°. The operation of the generator 1a is in all other respects identical to the operation of the generator 1 of FIG. 1 and need not be described further.

Referring now to FIGS. 3a, 3b, 3c, 3d, 3e, there are graphically represented a number of electrical quantities which are present in the generators of FIGS. 1 and 2 when the several inverters are operating in synchronism. These figures will be described in connection only with the inverters 3 and 3a. In FIG. 3a there is shown a curve 89 which represents the output voltage of the master inverter 3. It is noted that this voltage has a rectangular wave pattern.

In FIG. 3b, there is illustrated a curve 91 which represents the voltage which appears across the winding 83 of the phase locking saturable reactor 77. It is noted that this voltage also has a rectangular wave pattern with a time interval in each cycle when the voltage has a zero magnitude. This time interval represents the time during which the reactor 77 is in a saturated condition wherein the winding 83 has a very low impedance and consequently, has substantially zero voltage impressed thereacross. It is noted with reference to FIG. 3b that the time at which the reactor saturates corresponds to 120° of one cycle of the voltage depicted in FIG. 3a.

In FIG. 3c two curves 93 and 95 are shown which represent respectively the phase locking voltages which are applied to the transistors 27a and 29a of the slave inverter 3a. The broken line curve 93 represents the phase locking voltage which is applied between the base and emitter electrodes of the transistor 27a whereas the full line curve 95 represents the phase locking voltage which is applied between the base and emitter electrodes of the transistor 29a. It is noted that these voltages are displaced in phase by 180° indicating that voltages of opposite polarity are simultaneously applied to these transistors from the master inverter. It is also noted that during the time that the phase locking reactor 77 is proceeding toward a saturated condition the voltages 93 and 95 have substantially zero value. When the saturable reactor attains a saturated condition, the phase locking voltages rise to positive and negative values and remain at such values until the saturable reactor is driven out of saturation by a reversal of polarity of the output voltage of the master inverter.

The curves 97 and 99 in FIG. 3d represent the voltages appearing across the bias windings of the slave inverter 3a. The broken line curve 97 represents the voltage across the winding 31a whereas the full line curve 99 represents the voltage across the winding 33a. It is noted with reference to FIG. 3d that the voltages 97 and 99 reverse polarity at the time when the voltages 93 and 95 increase from their zero values in response to saturation of the saturable reactor. The voltages 97 and 99 remain in their reversed polarity conditions after the voltages 93 and 95 have again assumed their zero values. It is noted that the voltages 93 and 95 shown in FIG. 3c have peak values which are just slightly larger than the total peak values of the voltages 97 and 99. As stated previously, this condition provides a very effective switching action.

In FIG. 3e there is shown the output voltage 101 of the slave inverter 3a. It is noted that the voltage 101 reverses polarity each time that the voltages 97 and 99 reverse polarity, due to the fact that when the voltages 97 and 99 reverse polarity the direction of magnetization of the associated transformer core is also reversed. By inspection of FIGS. 3a and 3e it is observed that the initiation of the positive half cycles of the voltage 101 lags the initiation of the positive half cycles of the voltage 89 by 120°, which is the desired condition for output voltages of a three-phase generator. The voltages appearing in the slave inverter 3b are identical to those depicted in FIGS. 3b, 3c, 3d, 3e. However, the output voltage of the slave inverter 3b lags behind the output voltage of the inverter 3 by 240°.

Referring now to FIG. 4, there is illustrated a multiphase electrical generator which is of different construction than the generators illustrated in FIGS. 1 and 2. The generator of FIG. 4 is constructed to produce outputs which may be delta connected without introducing large circulating currents in the system. In FIG. 4 the three inverters 3, 3a and 3b are constructed in the same manner as the inverters shown in FIGS. 1 and 2. Therefore the construction and operation of the inverters of FIG. 4 will not be described.

In order to permit a delta connection of the output voltages of the generator of FIG. 4, means are provided to produce three phase-displaced output voltages wherein the algebraic sum of the voltages at any instant is equal to zero. This arrangement avoids the establishment of large circulating currents in the delta connected systems which would occur, for example, if the phase-displaced output voltages had waveforms of the configuration depicted in FIG. 3a. In the present invention, means are provided in the generator of FIG. 4 to produce output voltages having waveforms of the configuration illustrated in FIG. 3b. If such voltages are displaced in phase by 120° relative to one another, it may be shown that the algebraic sum of these voltages at any instant is equal to zero.

In the embodiment illustrated in FIG. 4, output voltages having the waveform configurations shown in FIG. 3b are produced by deriving voltages from the several phase locking reactors. It will be recalled that FIG. 3b illustrates a voltage 91 which appears across the winding 83 of the phase locking reactor 77. By providing additional windings which link the cores of the phase locking reactors, voltages will appear across such windings which have the same waveform configuration as voltages which appear across the input windings of these reactors.

In FIG. 4, phase locking reactors 103, 105 and 107 are associated respectively with the inverters 3, 3a and 3b. These reactors include respectively saturable magnetic cores 109, 111 and 113 which are preferably constructed of material exhibiting substantially rectangular hysteresis loop characteristics. The reactors further include respectively input windings 115, 117 and 119 which are connected in series relation with output windings 121, 123 and 125 which link the cores 13, 13a and 13b of the transformers of the three inverters.

In the present invention additional windings 127, 129 and 131 are provided to link respectively the cores 109, 111 and 113 in inductive relation with the associated input windings. With this arrangement voltages will be induced in the windings 127, 129 and 131 in response to energization of the associated input windings which have the waveform configuration as depicted in FIG. 3b. Output terminals 133 and 135, 137 and 139, and 141 and 143 are connected respectively to the terminals of the windings 127, 129 and 131. As illustrated in FIG. 4, these output terminals are connected to provide a delta connection of the voltages appearing across these terminals. The line voltages of the resulting delta connection may be taken between the terminals 135, 139 and 143 as illustrated in FIG. 4.

Although the invention has been described with reference to certain specific embodiments thereof, numerous modifications are possible and it is desired to cover all modifications falling within the spirit and scope of the invention.

We claim as our invention:

1. In a multiphase electrical generator, first and second generators each producing an alternating current output, and saturable reactor means including saturable magnetic core means, and winding means linking the core means, said second generator including control means having input terminals effective when energized from a source of electrical pulses for controlling the frequency of the second generator in accordance with the frequency of the pulses, said winding means being connected in series with said input terminals for energization in accordance with the output of the first generator for saturation of the core means by such output of the first generator to control operation of the second generator, said reactor means having a time delay in saturation effective to establish a preselected phase displacement between said outputs.

2. In a multiphase electrical generator, first and second generators each producing an alternating current output having a rectangular wave pattern, and saturable reactor means including saturable magnetic core means, and winding means linking the core means, said second generator including control means having input terminals effective when energized from a source of electrical pulses for controlling the frequency of the second generator in accordance with the frequency of the pulses, said winding means being connected in series with said input terminals for energization in accordance with the output of the first generator for saturation of the core means by such output of the first generator to control operation of the second generator, said reactor means having a time delay in saturation effective to establish a preselected phase displacement between said outputs.

3. In a multiphase electrical generator, first and second generators each producing an alternating current output, and saturable reactor means including saturable magnetic core means, and winding means linking the core means, said second generator including control means having input terminals effective when energized from a source of electrical pulses for controlling the frequency of the second generator in accordance with the frequency of the pulses, said winding means being connected in series with said input terminals for energization in accordance with the output of the first generator for saturation of the core means by such output of the first generator to control operation of the second generator, said reactor means having a time delay in saturation effective to establish a preselected phase displacement between said outputs, said second generator having a free-running frequency which is less than that of the one generator.

4. In a multiphase electrical generator, first and second generators each producing an alternating current output having a rectangular wave pattern, and saturable reactor means including saturable magnetic core means having substantially rectangular hysteresis loop characteristics, and winding means linking the core means, said second generator including control means having input terminals effective when energized from a source of electrical pulses for controlling the frequency of the second generator in accordance with the frequency of the pulses, said winding means being connected in series with said input terminals for energization in accordance with the output of the first generator for saturation of its core means by such output of the first generator to control operation of the second generator, said reactor means having a time delay in saturation effective to establish a preselected phase displacement between said outputs.

5. In a multiphase electrical generator, first, second, and third generators each producing an alternating current output, and first and second saturable reactor means each including saturable magnetic core means, and winding means linking the core means, each of said second and third generators including control means having input terminals effective when energized from a source of electrical pulses for controlling the frequency of the associated generator in accordance with the frequency of the pulses, the winding means of the first core means being connected in series with the input terminals of the second generator for energization in accordance with the output of the first generator for saturation of its core means by such output of the first generator to control operation of the second generator, the winding means of the second core means being connected in series with the input terminals of the third generator for energization in accordance with the output of the second generator for saturation of its core means by such output of the second generator to control operation of the third generator, said first and second reactor means each having a time delay in saturation effective to establish preselected phase displacements between the outputs of said generators.

6. In a multiphase electrical generator, three generators each having a pair of output terminals, said generators each producing at the associated output terminals an alternating current output consisting of spaced rectangular pulses alternating in polarity and of a duration equal to a first time interval which is equal to 120 electrical degrees in length, said pulses being spaced apart by a second time interval of 60 electrical degrees equal to one half said first time interval, said outputs each having the same frequency and being displaced in phase from each other by one hundred and twenty degrees, said pulses being spaced to provide an instantaneous sum of the outputs always equal to zero, and means connecting said output terminals to form a delta-connected output circuit.

7. In a multiphase electrical generator, direct voltage input means, and circuit means for deriving from said input means a plurality of phase displaced alternating voltages, said circuit means including a plurality of oscillator means each including a pair of voltage energizable switch means operable in phase opposition relative to each other, each of said oscillator means being connected for energization from said input means to produce in response to periodic operation of its associated switch means an alternating output voltage, said output voltages having phase relationships dependent upon the operating phase relationships of the switch means, and control means effective in response to operation of one of said oscillator means to control operation of the remaining oscillator means, said control means including a separate reactor associated with the switch means of each of the remaining oscillator means, each of said reactors including a magnetic core with an input winding linking the core; said cores being designed for magnetic saturation within the range of energization of the associated input windings, said input windings being connected for energization in accordance with output voltages produced in response to operation of said one of said oscillator means, the swtich means of said remaining oscillator means being operated in response to each saturation of the core of the associated reactor, said reactors being proportioned such that preselected times are required for the cores to transfer between opposing directions of saturation to establish displacements between the operating phases of the switch means of said plurality of oscillator means, said displacements effecting the establishment of corresponding phase displacements between said output voltages.

8. In a multiphase electrical generator, direct voltage input means, and circuit means for deriving from said input means a plurality of phase displaced alternating output voltages, said circuit means including a plurality of inverter means, each of said inverter means including a first magnetic core, input and output winding means linking the first core in inductive relation, a pair of parallel paths each including a section of said input winding means connected for energization from said input means, and a pair of switch means each included in a separate one of said paths operable in phase opposition relative to each other; each of said output winding means having alternating voltage induced therein in response to periodic reversals of the operating conditions of the associated switch means, said induced voltages having phase relationships dependent upon the operating phase relationships of the switch means, and control means effective in response to operation of one of said inverter means to control operation of the remaining inverter means, said control means including a separate reactor associated with the switch means of each of the remaining inverter means, each of said reactors including a second magnetic core and an input winding linking the second core; said second cores being designed for magnetic saturation within the range of energization of the associated input windings, said input windings being connected for energization in accordance with output voltages produced in response to operation of said one of said inverter means, the switch means of said remaining inverter means being operated in response to each saturation of the second core of the associated reactor, said reactors being proportioned such that preselected times are required for the second cores to transfer between opposing directions of saturation to establish displacements between the operating phases of the switch means of said plurality of inverter means, said displacements effecting the establishment of corresponding phase displacements between said output voltages.

9. In a multiphase electrical generator, direct voltage input means, and circuit means for deriving from said input means a plurality of phase displaced alternating output voltages, said circuit means including a plurality of inverter means, each of said inverter means including a first magnetic core, input and output winding means linking the first core in inductive relation, a pair of parallel paths each including a section of said input winding means connected for energization from said input means, and a pair of switch means each included in a separate one of said paths operable in phase opposition relative to each other; each of said output winding means having alternating voltage induced therein in response to periodic reversals of the operating conditions of the associated switch means, said induced voltages having phase relationships dependent upon the operating phase relationships of the switch means, control means effective in response to operation of one of said inverter means to control operation of the remaining inverter means, said control means including a separate reactor associated with the switch means of each of the remaining inverter means, each of said reactors including a second magnetic core and an input winding linking the second core; said second cores being constructed of material exhibiting substantially rectangular hysteresis loop characteristics designed for magnetic saturation within the range of energization of the associated input windings, said input windings being connected for energization in accordance with output voltages produced in response to operation of said one of said inverter means, the switch means of said remaining inverter means being operated in response to each saturation of the second core of the associated reactor, said reactors being proportioned such that preselected times are required for the second cores to transfer between opposing directions of saturation to establish displacements between the operating phases of the switch means of said plurality of inverter means, said displacements effecting the establishment of corresponding phase displacements between said output voltages, an output winding linking each of said second cores in inductive relation with the associated input winding, and a separate pair of output terminals connected to each of said output windings, said output terminals being connected to provide a mesh connection of said output windings, said reactors being proportioned so that the instantaneous algebraic sum of voltages induced in said output windings is zero.

10. In a three phase electrical generator, a source of direct voltage, three inverter circuits each including a magnetic core, input and output windings linking the core in inductive relation, a pair of parallel paths each including a section of said input winding connected for energization from said source, a pair of transistor switches each including emitter, collector and base electrodes with the emitter and collector electrodes of each transistor included in a separate one of said paths, and a pair of biasing windings linking said core in inductive relation with said input winding each connected between one of the emitter and collector electrodes and the base electrode of a separate one of said transistors; said biasing windings being connected to apply biasing voltages induced therein in response to a conductive condition of one of said paths while the other of said paths is in a non-conductive condition to the associated transistors for establishing opposing operating conditions of said transistors, each of said output windings having an alternating output voltage induced therein in response to periodic reversals of the operating conditions of the associated transistors, said output voltages having phase relationships dependent upon the operating phase relationships of the transistors, and control means effective in response to operation of one of said inverter circuits to control operation of the remaining inverter circuits, said control means including separate gating means connected to apply voltage pulses derived from output voltages produced in response to operation of a first and a second of said inverter circuits in series circuit relation with the biasing windings of said second and a third of said inverter circuits respectively, said gating means being arranged such that time displaced voltage pulses are applied with magnitude and polarity effective to establish displacements of the operating phases of the transistors of said inverter circuits, said displacement of said operating phases effecting the establishment of corresponding phase displacements between said output voltages.

11. In a three phase electrical generator, a source of direct voltage, three inverter circuits each including a first magnetic core, first input and output windings linking the first core in inductive relation, a pair of parallel paths each including a section of said first input winding connected for energization from said source, a pair of transistor switches each including emitter, collector and base electrodes with the emitter and collector electrodes of each transistor included in a separate one of said paths, and a pair of biasing windings linking said first core in inductive relation with said first input winding each connected between one of the emitter and collector electrodes and the base electrode of a separate one of said transistors; said biasing windings being connected to apply biasing voltages induced therein in response to a conductive condition of one of said paths while the other of said paths is in a non-conductive condition to the associated transistors for establishing opposing operating conditions of said transistors, each of said first output windings having an alternating output voltage induced therein in response to periodic reversals of the operating conditions of the associated transistors, said output voltages having phase relationships dependent upon the operating phase relationships of the transistors, and control means effective in response to operation of one of said inverter circuits to control operation of the remaining inverter circuits, said control means including a separate reactor associated with each of the remaining inverter circuits, each of said reactors including a second magnetic core with a second input winding linking the second core; said second cores being designed for magnetic saturation within the range of energization of said second input windings, said second input windings being connected in series relation with the associated biasing windings for energization in accordance with output voltages produced in response to operation of said one of said inverter circuits, and separate resistance means connected in series relation with each of said second input windings, said resistance means developing voltage pulses in response to each saturation of the associated second cores effective to operate the associated switches, said reactors being proportioned such that preselected times are required for the second cores to transfer between opposing direction of saturation to establish displacements between the operating phases of the transistors of said inverter circuits, said displacements effecting the establishment of corresponding phase displacements between said output voltages.

12. In a three phase electrical generator, a source of direct voltage, three inverter circuits each including a first magnetic core, first input and output windings linking the first core in inductive relation, a pair of parallel paths each including a section of said first input winding connected for energization from said source, a pair of transistor switches each including emitter, collector and base electrodes with the emitter and collector electrodes of each transistor included in a separate one of said paths, and a pair of biasing windings linking said first core in inductive relation with said first input winding each connected between one of the emitter and collector electrodes and the base electrode of a separate one of said transistors, said biasing windings being connected to apply biasing voltages induced therein in response to a conductive condition of one of said paths while the other of said paths is in a non-conductive condition to the associated transistors for establishing opposing operating conditions of said transistors, the operating conditions of said transistors being dependent upon the polarities of biasing voltages applied thereto, each of said first output windings having an alternating output voltage induced therein in response to periodic reversals of the operating conditions of the associated transistors, said output voltages having phase relationships dependent upon the operating phase relationships of the associated transistors, and control means effective in response to operation of one of said inverter circuits to control operation of the remaining inverter circuits, said control means including a separate reactor associated with each of the remaining inverter circuits, each of said reactors including a second magnetic core, and a second input winding linking the second core; said second cores being constructed of material exhibiting substantially rectangular hysteresis loop characteristics designed for magnetic saturation within the range of energization of said second input windings, a pair of second output windings linking the first core of said one of said inverter circuits in inductive relation with the associated first input winding, each of said second output windings being connected in series circuit relation with the biasing windings of a separate one of said remaining inverter circuits, each of said second input windings being connected in series circuit relation with a separate one of said second output windings for energization in accordance with the output voltage of said one inverter circuit, and separate resistance means connected in series relation with each of said second input windings, said second output windings being connected such that voltage pulses of opposite polarities are simultaneously developed across the two resistance means in response to each saturation of the associated second core means effective to operate the associated transistors of said remaining inverter circuits, said reactors being proportioned such that preselected different times are required for the second cores to transfer between opposing directions of saturation to establish displacements between the operating phases of the transistors of said three inverter circuits, said displacements effecting the establishment of corresponding phase displacements between said output voltages.

13. In a three phase electrical generator, a source of direct voltage, three inverter circuits each including a first magnetic core, first input and output windings linking the first core in inductive relation, a pair of parallel paths each including a section of said first input winding connected for energization from said source, a pair of transistor switches each including emitter, collector and base electrodes with the emitter and collector electrodes of each transistor included in a separate one of said paths, and a pair of biasing windings linking said first core in inductive relation with said first input winding each connected between one of the emitter and collector electrodes and the base electrode of a separate one of said transistors, said biasing windings being connected to apply biasing voltages induced therein in response to a conductive condition of one of said paths while the other of said paths is in a non-conductive condition to the associated transistors for establishing opposing operating conditions of said transistors, the operating conditions of said transistors being dependent upon the polarities of biasing voltages applied thereto, each of said first output windings having an alternating output voltage induced therein in response to periodic reversals of the operating conditions of the associated transistors, said output voltages having phase relationships dependent upon the operating phase relationships of the transistors, three reactors each having a second magnetic core, and a second input winding linking the second core; said second core being constructed of material exhibiting substantially rectangular hysteresis loop characteristics designed for magnetic saturation within the range of energization of said second input windings, each of said second input windings being connected for series energization from a separate one of said first output windings in accordance with voltage induced in the associated first output winding, each of the second input windings of two of said reactors being connected in series relation with the biasing windings of a separate one of two of said inverter circuits, separate resistance means connected in series relation with each of the second output windings of said two reactors, said resistance means developing voltage pulses in response to each saturation of the second cores of said two reactors effective to operate the transistors of said two inverter circuits, said reactors being proportioned such that preselected times are required for the second cores to transfer between opposing directions of saturation to establish displacements between the operating phase of the transistors of said inverter circuits, said displacements effecting the establishment of phase displacements between said output voltages, a separate second output winding linking each of said second cores in inductive relation with the associated second input winding, and a separate pair of output terminals connected to each of said second output windings, said output terminals being connected to provide a delta connection of said second output windings, said reactors being proportioned so that the instantaneous algebraic sum of voltages induced in said second output windings is zero.

14. In a three phase electrical generator, a source of direct voltage, three inverter circuits each including a first magnetic core, first input and output windings linking the first core in inductive relation, a pair of parallel paths each including a section of said first input winding connected for energization from said source, a pair of transistor switches each including emitter, collector and base electrodes with the emitter and collector electrodes of each transistor included in a separate one of said paths, and a pair of biasing windings linking said first core in inductive relation with said first input winding each connected between one of the emitter and collector electrodes and the base electrode of a separate one of said transistors; said biasing windings being connected to apply biasing voltages induced therein in response to a conductive condition of one of said paths while the other of said paths is in a non-conductive condition to the associated transistors for establishing opposing operating conditions of said transistors, each of said first output windings having an alternating output voltage induced therein in response to periodic reversals of the operating conditions of the associated transistors, said output voltages having phase relationships dependent upon the operating phase relationships of the transistors, and control means effective in response to operation of one of said inverter circuits to control operation of the remaining inverter circuits, said control means including a separate reactor associated with each of the remaining inverter circuits, each of said reactors including a second magnetic core with a second input winding linking the second core; said second cores being designed for magnetic saturation within the range of energization of said second input windings, said second input windings being connected in series relation with the associated biasing windings for energization in accordance with output voltages produced in response to operation of said one of said inverter circuits, and separate resistance means connected in series relation with each of said second input windings, said resistance means developing voltage pulses in response to each saturation of the associated second cores effective to operate the associated switches, said reactors being proportioned such that preselected times are required for the second cores to transfer between opposing directions of saturation to establish displacements between the operating phases of the transistors of said inverter circuits, said displacements effecting the establishment of corresponding phase displacements between said output voltages, an additional reactor associated with said one of said inverter circuits, said additional reactor including a third magnetic core, a third winding linking the third core, said third core being constructed of material exhibiting rectangular hysteresis loop characteristics designed for magnetic saturation within the range of energization of said third winding, a fourth winding linking the first core of said one inverter circuit, and additional resistance means connected in series circuit with said third and fourth windings, and with the biasing windings of said one inverter circuit, said additional resistance means being connected to apply voltages developed thereacross in response to each saturation of said third core to operate the transistors of said one inverter circuit.

15. In a three phase electrical generator, a source of direct voltage, three inverter circuits each including a first magnetic core, first inut and output windings linking the first core in inductive relation, a pair of parallel paths each including a section of said first input winding connected for energization from said source, a pair of transistor switches each including emitter, collector and base electrodes with the emitter and collector electrodes of each transistor included in a separate one of said paths, and a pair of biasing windings linking said first core in inductive relation with said first input winding each connected between one of the emitter and collector electrodes and the base electrode of a separate one of said transistors; said biasing windings being connected to apply biasing voltages induced therein in response to a conductive condition of one of said paths while the other of said paths is in a non-conductive condition to the associated transistor for establishing opposing operating conditions of said transistors, each of said first output windings having an alternating output voltage induced therein in response to periodic reversals of the operating conditions of the associated transistors, said output voltages having phase relationships dependent upon the operating phase relationships of the transistors, and control means effective in response to operation of one of said inverter circuits to control operation of the remaining inverter circuits, said control means including a separate reactor associated with each of the remaining inverter circuits, each of said reactors including a second magnetic core with a second input winding linking the second core; said second cores being designed for magnetic saturation within the range of energization of said second input windings, said second input windings being connected in series relation with the associated biasing windings for energization in accordance with output voltages produced in response to operation of said one of said inverter circuits, and separate resistance means connected in series relation with each of said second input windings, said resistance means developing voltage pulses in response to each saturation of the associated second cores effective to operate the associated switches, said reactors being proportioned such that preselected times are required for the second cores to transfer between opposing directions of saturation to establish displacements between the operating phases of the transistors of said inverter circuits, said displacements effecting the establishment of corresponding phase displacements between said output voltages, an additional reactor associated with said one of said inverter circuits, said additional reactor including a third magnetic core, a third winding linking the third core, said third core being constructed of material exhibiting rectangular hysteresis loop characteristics designed for magnetic saturation within the range of energization of said third winding, a fourth winding linking the first core of said one inverter circuit, and additional resistance means connected in series circuit with said third and fourth windings and with the biasing windings of said one inverter circuit, said additional resistance means being connected to apply voltages developed thereacross in response to each saturation of said third core to operate the transistors of said one inverter circuit, and a condenser connected across said third winding.

16. In a multiphase electrical apparatus, three generators each having a pair of output terminals, each said generator being effective to producing a first pulse of potential of one polarity and of a duration of 120 electrical degrees followed by a deenergized time interval of 60 electrical degrees and thereafter a second pulse of potential of a polarity opposite to said one polarity and of a duration of 120 electrical degrees followed by a deenergized time interval of 60 electrical degrees, means for staggering the operations of said generators whereby said first pulses of each said generator follow each other at intervals of 120 electrical degrees whereby solely two said generators are energized at any one instant, and means connecting said output terminals in polyphase connection.

17. In an electrical inverter, a pair of input terminals adapted to be energized from a source of unidirectional potential, a pair of output terminals, a pair of current controlling valves, each said valve having a power conducting circuit and a power controlling circuit, a first current conducting path interconnecting said pairs of terminals and including said power conducting circuit of a first of said valves, a second current conducting path interconnecting said pairs of terminals and including said power conducting circuit of a second of said valves, said first path being operable to energize said output terminals in a first polarity, said second path being operable to energize said output terminals in a second polarity, first and second windings inductively coupled to said paths and energized in opposite polarities as a consequence of current flowing through said paths in opposite directions, means connecting said first winding to said power controlling circuits in a polarity such that the conducting one of said power conducting circuits is held conducting and the non-conducting one of said power conducting circuits is held non-conducting, a saturating core inductor, means including said inductor connecting said second winding to said power controlling circuits in a polarity to render the conducting one of said power controlling paths non-conducting and the non-conducting one of said paths conducting, the magnitude of the potential of said windings being so related that prior to saturation of said inductor the voltage provided by said first winding will dominate the voltage provided by said second winding and when said inductor is saturated the voltage provided by said second winding will dominate the voltage provided by said first winding.

18. In an electrical inverter, a transformer having a core and plural winding portions, first and second semiconductor devices, each said device including three electrodes, a pair of input terminals, a first current path connecting said input terminals to a first winding portion of said plural winding portions, and including a pair of said electrodes of said first device, a second current path connecting said input terminals to a second winding portion of said plural winding portions and including a pair of said electrodes of said second device, said first and second winding portions being so arranged relative to the direction of current flow through said devices such that current flow through said first path causes an increase in flux in said core in a first direction and current flow through said second path causes an increase in flux in said core in a second direction, means connecting a third winding portion of said plural winding portions between one of said pair of electrodes and a third of said electrodes of said first device in a polarity such that an increase of flux in said core in said first flux direction causes said first device to conduct current between its said pair of electrodes, means connecting a fourth winding portion of said plural winding portions between one of said pair of electrodes and a third of said electrodes of said second device in a polarity such that an increase of flux in said core in said second flux direction causes said second device to conduct current between its said pair of electrodes, an inductive device having a coil and a core which saturates within the conductive range of said coil, and means including said coil connecting a fifth winding portion of said plural winding portions between said third and said one electrodes of each said device and in polarities opposite to the potentials supplied by said third and fourth winding portions.

19. In an inverter, a transformer having a core and plural winding portions, first and second transistors, each said transistor having a pair of main electrodes and a control electrode, a pair of input terminals, means connecting a first of said input terminals to corresponding first electrodes of each of said pair of electrodes, means connecting the second of said terminals to a second of said pair of electrodes of said first transistor and including a first of said winding portions, means connecting said second terminal to the second of said pair of electrodes of said second transistor and including a second of said winding portions, an impedance element having first and second connections and an intermediate connection, means connecting said intermediate connection to said first electrodes, means connecting said first connection to said control electrode of said first transistor and including a third of said plural winding portions, means connecting said second connections to said control electrode of said second transistor and including a fourth of said plural winding portions, an inductive device, and means connecting a fifth of said plural windings between said control electrodes and including said inductive device, said third and said fourth winding portions being polarized to provide a potential between said control electrode and said first electrode of said first and second transistors to drive said first and second transistors toward saturation as a consequence of their respective conduction, said fifth winding portion being polarized to provide voltages in opposition to said third and fourth winding portions.

20. In an inverter, a transformer having a core and plural winding portions, first and second transistors, each said transistor having a pair of main electrodes and a control electrode, a pair of input terminals, means connecting a first of said input terminals to corresponding first electrodes of each of said pair of electrodes, means connecting a second of said terminals to a second electrode of said pair of electrodes of said first transistor and including a first of said winding portions, means connecting said second terminal to a second electrode of said pair of electrodes of said second transistor and including a second of said winding portions, first and second resistors, means connecting a third of said winding portions between said control electrode and said first electrode of said first transistor and including said first resistor, means connecting a fourth of said winding portions between said control electrode and said first electrode of said second transistor and including said second resistor, a reactor having a winding and a core of magnetic material which exhibits a substantially rectangular hysteresis look and which core saturates within the working range of the current flow through said reactor winding, and means connecting a fifth of said winding portions between said control electrodes and including said reactor winding, the polarities of said winding portions being such that at a given instant the potentials applied by said third and fourth winding portions to said control electrodes of said first and second transistors are in opposite phase and in which the potentials applied by said fifth winding portion to said control electrodes of said first and second transistors are in opposite phase to the potentials applied thereto by said third and fourth winding portions.

21. In an inverter, a transformer having a core and plural winding portions, first and second transistors, each said transistor having an emitter and a collector and a base, a pair of input terminals, means connecting a first of said input terminals to said emitters, means connecting a second of said terminals to said collector of said first transistor and including a first of said winding portions, means connecting said second terminal to said collector of said second transistor and including a second of said winding portions, first and second resistors, means connecting a third of said winding portions between said control electrode and said emitters of said first transistor and including said first resistor, means connecting a fourth of said winding portions between said control electrode and said emitters of said second transistor and including said second resistor, a reactor having a winding and a core of magnetic material which exhibits a substantially rectangular hysteresis loop and which core saturates within the working range of the current flow through said reactor winding, and means connecting a fifth of said winding portions between said bases and including said reactor winding, the polarities of said winding portions being such that at a given instant the potentials applied by said third and fourth winding portions to said bases are in opposite phase and in which the potentials applied by said fifth winding portion to said bases are in opposite phase to the potentials applied thereto by said third and fourth winding portions.

22. In an inverter, a transformer having a core and plural winding portions, first and second transistors, each said transistor having an emitter and a collector and a base, a pair of input terminals, means connecting a first of said input terminals to said emitters, means connecting a second of said terminals to said collector of said first transistor and including a first of said winding portions, means connecting said second terminal to said collector of said second transistor and including a second of said winding portions, first and second resistors, means connecting a third of said winding portions between said control electrode and said emitters of said first transistor and including said first resistor, means connecting a fourth of said winding portions between said control electrode and said emitters of said second transistor and including said second resistor, a reactor having a winding and a core of magnetic material which exhibits a substantially rectangular hysteresis loop and which core saturates within the working range of the current flow through said reactor winding, means connecting a fifth of said winding portions between said bases and including said reactor winding, the polarities of said winding portions being such that at a given instant the potentials applied by said third and fourth winding portions to said bases are in opposite phase and in which the potentials applied by said fifth winding portion to said bases are in opposite phase to the potentials applied thereto by said third and fourth winding portions and a capacitor connected in shunt with said reactor winding.

No references cited.